United States Patent [19]
Voss et al.

[11] 3,766,895
[45] Oct. 23, 1973

[54] ELECTRIC SPEED CONTROL SYSTEM AND MORE-THAN-TWO-STATE PHASE DETECTOR SUITABLE FOR USE THEREIN

[75] Inventors: James R. Voss, Wilbraham; William R. Ferry, Agawan, both of Mass.

[73] Assignee: Ambac Industries, Incorporated, Springfield, Mass.

[22] Filed: Aug. 13, 1971

[21] Appl. No.: 171,629

[52] U.S. Cl.............................. 123/102, 340/146.2
[51] Int. Cl........................................... F02d 11/10
[58] Field of Search............................. 123/103, 102

[56] References Cited
UNITED STATES PATENTS
| | | | |
|---|---|---|---|
| 3,651,460 | 3/1972 | Gebelein, Jr. | 123/102 X |
| 3,374,374 | 3/1968 | Smith | 317/5 |
| 3,525,017 | 8/1970 | Rosenberg et al. | 123/102 X |

Primary Examiner—Laurence M. Goodridge
Attorney—Howson & Howson

[57] ABSTRACT

An engine speed electric governer employing a more-than-two-state phase detector to generate the control signal for holding the engine speed at a predetermined nominal value corresponding to a null voltage level produced by one of the interior states of a more-than-two-state phase detector (typically a three-state detector), whereby the output of the phase detector during normal locked-in operation comprises a DC voltage plus only very narrow pulses of low duty cycle and the filtering of the phase detector output is simplified. On occasions when a sudden load change causes the engine speed to change enough to prevent lock-in of the detector, the detector produces an unambiguous electrical signal for returning the engine speed to the lock-in range. The phase detector preferably comprises a differential-input operational amplifier having an inverting input terminal and a non-inverting input terminal, a direct-coupled negative feedback circuit from the output terminal thereof to the inverting input terminal, and a direct-coupled positive feedback circuit which is connected between the output terminal and the non-inverting input terminal when the output voltage of the amplifier lies outside a central range in either direction but which is disconnected by the action of appropriately biased diode-rectifiers when the output voltage is in the central range.

10 Claims, 6 Drawing Figures

ELECTRIC SPEED CONTROL SYSTEM AND MORE-THAN-TWO-STATE PHASE DETECTOR SUITABLE FOR USE THEREIN

BACKGROUND OF THE INVENTION

This invention relates to electrical speed control systems and circuits suitable for use therein, and will be described with particular relation to electrical engine-speed governors.

Engine speed governor systems are known in which an electrical signal related to engine speed is derived, its frequency detected, and a control signal thereby developed for application to a speed controlling element of the engine to accomplish the desired automatic control. The frequency detecting means may comprise a phase-locked loop frequency detector containing a voltage controlled oscillator (VCO), the phase of the output signal from the VCO being compared by the phase detector with the phase of the signal representing engine speed, and the output of the phase detector used to control the frequency of operation of the VCO in such manner that it follows closely the frequency of the speed-representing signal. So long as this arrangement remains phase locked, any tendency of the engine-speed representing signal to depart from a predetermined reference value thereof in either direction will produce a corresponding change in the voltage applied to the VCO, in an amount and sense to maintain the phase-locked condition. Accordingly, the output voltage of the phase detector is also an indication of the magnitude and sense of departures of the engine-speed representing signal from the predetermined reference value thereof. The phase detector output voltage is therefore usable, with appropriate filtering, as a control voltage for providing the automatic control of engine speed.

In the typical prior-art phase detector utilized for such purposes, there is employed a device having two stable voltage states into one of which it is driven by pulses synchronized with the engine-speed representing signal and into the other of which it is driven by pulses synchronized with the VCO output. As a result, the phase detector produces output pulses the widths of which represent the relative phase between the engine-speed representing signals and the VCO signal. Because of the phase-locked loop arrangement, these pulses, when appropriately filtered, will indicate deviations of the engine speed from the desired value.

Such arrangements, however, have a number of drawbacks. Firstly, when the frequency deviation becomes so large that phase lock no longer occurs, the output of the phase detector becomes ambiguous and there is no clear, unambiguous, correction signal generated for driving the engine speed back toward the lock-in range. Accordingly, once such large deviations occur, control is lost. To correct this difficulty, it is possible to employ various logic and counter circuits which sense such loss of control and produce suitable voltages for urging the system back into the lock-in condition. However, such circuits introduce substantial additional complexity, cost, and opportunity for error or failure. Furthermore, in such types of systems, in order to provide control for both senses of deviation of engine speed, the system is normally adjusted so that the null value of control signal occurring when the engine speed has the desired frequency is in the center of the range of the output of the phase detector, and the pulses representing engine speed occur half way between the VCO pulses. The resultant approximately 50 percent duty cycle has a very strong fundamental frequency component which is difficult to filter out, i.e., requires relatively strong filtering action. However, strong low-pass filtering tends to interfere with rapid correcting action of the system, particularly for low engine speeds which may be comparable to or near the rate of variations to be corrected. This imposes limitations on the design of the system, and also generally increases the complexity and cost of the filters used.

Systems are also known in which the speed of an engine is synchronized with the frequency of a reference source by comparing pulses representative of engine speed with pulses representative of the reference source signal in a more-than-two-state phase detector, and utilizing the output of the detector to control the engine speed. Such a system is shown, for example, in the U.S. Pat. No. 3,038,104 of J. H. Wessels, issued June 5, 1962. This more-than-two-state detector is such that pulses representing engine speed move the detector always to its next-higher state, for example, while reference pulses move it to the next-lower state. However, in such systems in which the phase error signals are used directly to control engine speed, there is no convenient way of controlling the gain of the complete control system loop, and the reference patent mentioned shows no gain control arrangement at all.

Also, the more-than-two state detector shown in the Wessels patent is relatively complex, utilizing a number of vacuum tube stages, generally with inductive devices for supplying the inputs to the phase detectors, arrangements which are relatively costly, complex and expensive, as well as introducing increased possibility of error or malfunction.

Accordingly, it is an object of the invention to provide a new and useful speed control system.

A further object is to provide such a speed-governor system which provides an unambiguous correcting signal for returning the system to its locked-in condition when wide deviations in frequency have occurred, moving the system outside its lock-in range.

Another object is to provide a new and useful more-than-two state phase detector.

A further object is to provide such a detector in which the electrical filtering requirements are substantially less stringent than in previously known systems.

Another object is to provide such a detector which has a wider lock-in range than does a two-state detector.

Another object of the invention is to provide an improved more-than-two state phase detector of increased simplicity, lower cost and improved reliability.

SUMMARY OF THE INVENTION

These and other objects and features of the invention are achieved by the provision of a novel electrical engine speed governor system and a more-than-two state phase detector suitable for use therein, as follows.

The phase detector of the invention comprises an amplifying circuit having an output terminal, having a non-inverting input terminal responsive to input signals applied thereto to produce at said output terminal an amplified signal component in phase with the input signal thereto, and having an inverting input terminal responsive to input signals thereto for producing at said output terminal an amplified signal component of opposite phase to said input signals thereto. A direct-coupled negative feedback path is provided connecting said output terminal to said inverting input terminal, and a direct-coupled positive feedback path is provided connecting said output terminal to said non-inverting input terminal. Means are provided for causing the feedback produced by said negative feedback path to be stronger than the positive feedback produced by said positive feedback path when the voltage at said output terminal is within a predetermined range thereby to provide a stable interior state for the detector, but to be smaller than said positive feedback when said voltage at said output terminal is on either side of said predetermined range thereby to provide a pair of more extreme stable states on opposite sides of the interior state. Means are also provided for applying pulse signals to at least one of said input terminals for switching the voltage at said output terminal between said predetermined range and values on either side of said predetermined range. When the phase detector is quiescent in said interior state, the output voltage thereof is held at a predetermined fixed stable value within said predetermined range by the action of the negative feedback path; when said output voltage rises above said predetermined range, the positive feedback causes the output voltage to be driven to one more extreme stable voltage state above said interior state; and when the output voltage is caused to fall below said predetermined range the positive feedback causes the detector circuit to assume an output voltage state below said interior state.

The improved phase detector of the invention responds to each pulse of a first series applied to an input terminal thereof to change to its next higher state, and to each pulse of a second series applied to an input terminal thereof to change to its next lower state, and remains in the state in which it is so placed until the next subsequent input pulse of either series occurs. Preferably, the two sets of pulses are of opposite polarity and are applied to said inverting input terminal. The circuit is not confused by the presence of two simultaneous or nearly simultaneous input pulses, requires only a single amplifying device such as a standard differential-input operational amplifier, does not require inductive arrangements for supplying signals thereto, and is simple, compact, reliable and inexpensive. The above-described change in relative strengths of the positive and negative feedback paths is preferably provided by diode rectifier devices biased so as to disconnect the positive feedback circuit when the output voltage is in said predetermined range and to re-connect it when the output voltage departs from said range in either direction. Preferably also, the negative feedback path comprises capacitive means providing a discharge time-constant slightly longer than the decay time-constant of the control input pulses.

The electric governor system of the invention utilizes a more-than-two state phase detector connected in a phase-locked loop circuit with a voltage controlled oscillator (VCO) to produce from the phase detector pulses which, after appropriate filtering, are representative of deviations from a predetermined desired value of the frequency of an engine-speed representing signal applied as one input to the phase detector. The filtered output of the phase detector is preferably passed through an integrator circuit which develops the control signal for automatically adjusting engine speed.

The system is adjusted so that the desired reference speed of the engine occurs when the output of the phase detector has a value equal to the voltage level of one of its interior states, i.e. in the case of a three-state phase detector a value equal to the center state. Because of this arrangement, when the system is locked in synchronism the output of the phase detector will consist primarily of the DC level of the selected interior state, with occasional very narrow pulses of one polarity or the other providing the desired correcting voltages. Because of this, very little filtering is required to remove the effects of the narrow pulses, and the filtering of the phase detector output supplied to the engine speed control and to the VCO can therefore be made more effective, less complex and less expensive. When this more-than-two state detector falls out of phase lock as may occur, for example due to sudden large loads on the engine, the phase detector operates cyclically between its interior state and a particular one of its extreme states, and provides an unambiguous voltage indicative of the direction of change of engine speed required to return it into the range where lock-in can again occur.

The system of the invention therefore provides unambiguous correcting signals when phase lock is lost and, where the phase detector of the invention is utilized therein, also provides reliable operation with relatively simple filtering of the phase detector output signal. Increased accuracy, reliability and compactness, with reduced expense and chance of failure are thereby achieved.

BRIEF DESCRIPTION OF FIGURES

These and other objects and features of the invention will be more readily understood from the following detailed description, taken with the accompanying drawings, in which.

DETAILED DESCRIPTION OF SPECIFIC EMBODIMENTS

Figure 1:
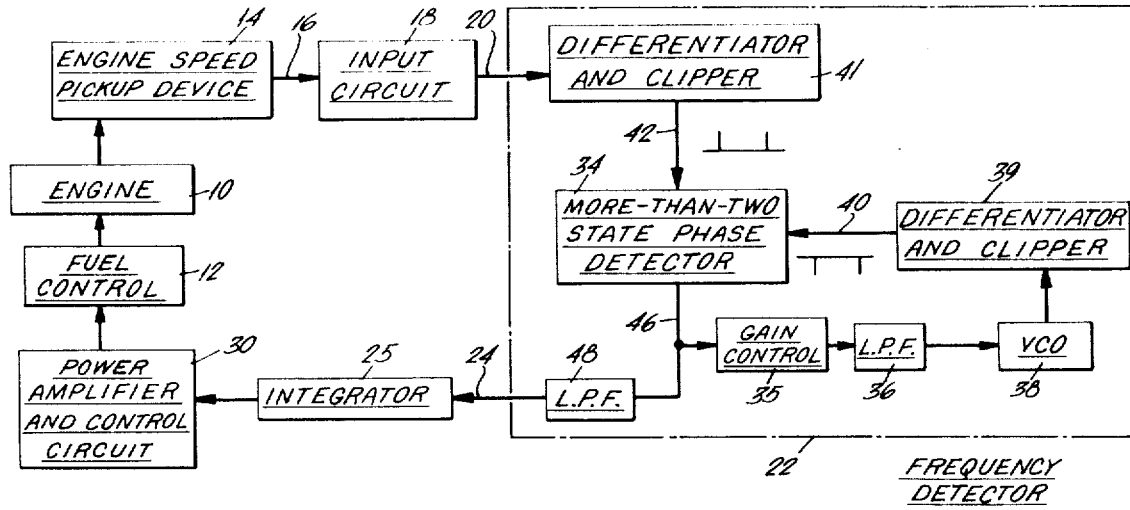
FIG. 1 is a block diagram of a system in which the invention is useful.

Referring now to the embodiment of the invention illustrated in block form in FIG. 1 by way of example only, an engine 10, which may for example be a diesel-fueled engine, is provided with a fuel control 12 which causes fuel to be supplied to the engine at a rate determined by the mechanical position of an element of the fuel control. As an example, fuel control 12 may be a spring-biased rotary solenoid actuator of the type described and claimed in U.S. Pat. No. 3,435,395, issued Mar. 25, 1969 to M. I. Rosenberg et al. Associated with the engine 10 is an engine speed pickup device 14 for generating a signal having a frequency related to engine speed. Various devices are known to provide this function. In some cases a magnet is rotated by the engine, for example by affixing it to the flywheel or camshaft or to a gear tooth driven by the engine, and a pickup coil positioned adjacent thereto produces an alternating output signal varying at a harmonic or subharmonic of the engine rate. The output of the usual alternator may also be used for this purpose. Regardless of the particular type of pickup device utilized, the signal on the output lead 16 thereof will be synchronous with engine operation, and typcially approximates a sinusoidal signal or, in some cases, may be more nearly a pulse type signal.

An input circuit 18 is preferably employed as an amplifier and pulse shaper to convert the signal from device 14 into a rectangular wave with steep sides. Preferrred for use as the input circuit 18 is that described and claimed in our co-pending application Ser. No. 171,504, filed 8-13-71 now U.S. Pat. No. 3,724,433, and entitled Engine Governor System with Signal Loss Protection and Controlled Oscillator Circuit Suitable for Use Therein, which will produce at output lead 20 a square wave in phase with the signal from pickup device 14 and also will provide a higher-rate output signal should the signal from pickup device 14 become very small or disappear entirely, thereby to provide a fail-safe feature for the system as described in said co-pending application.

The steep-sided wave on lead 20 is applied to the frequency detector 22, which produces at its output lead 24 a relatively slowly varying DC voltage representing the magnitude and sense of deviations of the engine speed from a desired reference value. Thus the signal at output lead 24 has a null value when the engine speed is at the desired value, and departs in either direction therefrom depending upon the direction of deviation of the engine speed.

The frequency detector output on lead 24 is passed through the integrator 25 and the power amplifier and control circuit 30, wherein the signal is integrated, amplified and placed in the desired form for application to the fuel control 12. As an example, circuit 30 may include a "dither" circuit which causes the mechanical control element of the fuel control 12 to oscillate back and forth over a small excursion, the average position thereof being the effective value so far as affecting the speed of the engine 10 is concerned. The purpose of the integrator 25 will be discussed more fully hereinafter.

Frequency detector 22 comprises a phase-locked loop arrangement comprising a phase detector 34, the output of which is passed through a gain control 35 and a low-pass filter 36, and applied to the frequency-control electrode of a voltage controlled oscillator 38, the output of the voltage controlled oscillator (VCO) being passed through the differentiator and clipper 39 to one control input terminal of the phase detector 34 over line 40. The other control input of the phase detector 34 is supplied with the engine-speed representing signal on line 20 after it has passed through differentiator and clipper 41, to output lead 42. While the two inputs to the phase detector 34 are shown as applied to separate points thereof, in the preferred form described hereinafter the phase detector includes elements which supply the two input signals to the same control element of an amplifying device within the phase detector, the polarities of the pulses produced on leads 40 and 42 being of opposite polarity, however. Phase detector 34, to be described in greater detail in connection with FIG. 2, responds to the input pulses of one polarity to shift to the next level or state thereof in one direction, and responds to the input pulses of the opposite polarity to shift between states or levels thereof in the opposite direction. As will also be described in detail the output of the phase detector on output lead 46 thereof consists of pulses having widths determined by the relative phases of the occurrences of successive pulses applied thereto, and the latter output is passed through a low-pass filter 48 to remove the pulse components thereof and produce an output signal on lead 24 varying substantially in acccordance with the average value of the voltage on line 46

Figure 2:
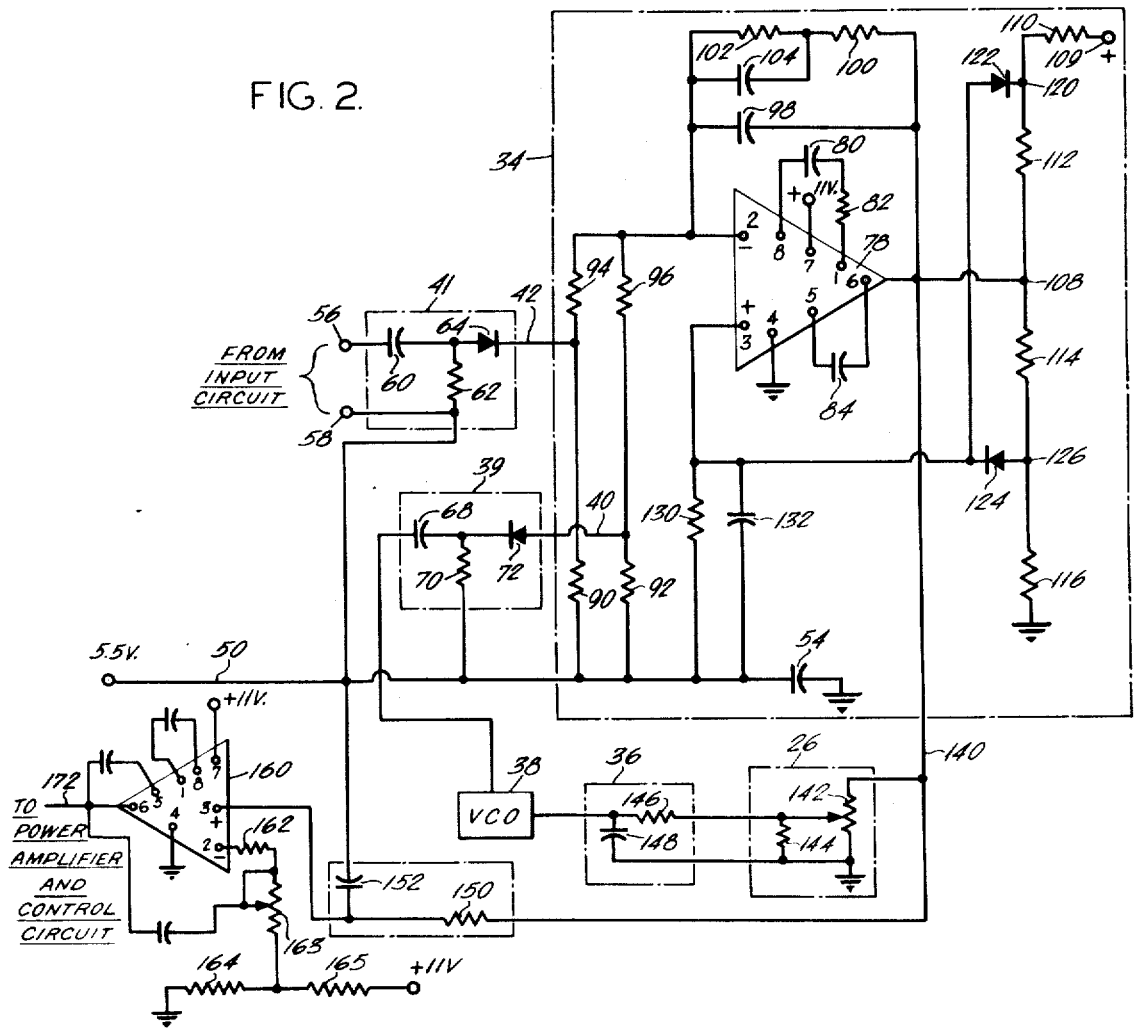
FIG. 2 is a schematic diagram of one preferred form of the more-than-two-state detector of the invention.

Referring now to FIG. 2, wherein parts corresponding to those of FIG. 1 are indicated by corresponding numerals, the circuit shown may be powered from a supply source providing a suitable B+ potential with respect to ground, for example 11 volts, and by a lower supply potential which may be about one-half of the primary supply potential, for example about 5.5 volts, these values of supply voltage being assumed during the following discussion as an aid to definiteness without in any way thereby limiting the invention. Thus, there is provided a 5.5 volt bus 50, appropriately bypassed to ground for all signal-produced voltage variations in the circuit, as by means of the large-valued capacitor 54.

The square-wave signal representative of engine speed from input circuit 18 is applied across terminals 56 and 58 and thence to the combination of series capacitor 60 and shunt resistor 62 having values such as to cause differentiation of the input square-wave, thereby to produce narrow pulses or voltage pips in phase with the positive-going and negative-going edges of the square waves, the trailing edge of each such narrow pulse having a decay time-constant determined by the time-constant of 60 and 62. The diode 64 serves as a clipper passing only the positive differentiated pulses or pips to output line 42. Similarly, the output of the VCO 38, which is preferably a rectangular wave, is passed through the differentiator comprising capacitor 68 and resistor 70 and thence through the positive-clipping diode 72 to produce the negative pulses or pips on line 40 in phase with the VCO output signal, the decay time-constant of each such pulse being determined by the time constant of 68 and 70.

The more-than-two-state phase detector 34 in this example is a three-state device utilizing as the amplifying element a conventional operational amplifier 78, which may be a standard commercial integrated-circuit type of operational amplifier, such as the type 1709 made by a number of companies. The terminals thereof are numbered to correspond with the terminal numbers conventionally applied thereto in the art. Thus, according to standard practice terminal 4 is grounded, terminal 7 is supplied with the positive supply voltage of 11 volts in this example, a series combination of capacitor 80 and resistor 82 is provided between terminals 1 and 8 to provide the usual input compensation, and capacitor 84 is connected between 5 and 6 to provide the usual output compensation. The operational amplifier is of the differential input type in that signals applied to the minus, or inverting, input terminal 2 thereof produce corresponding signal components of the opposite phase at the output terminal 6, while input signals applied to the plus, or non-inverting, input terminal 3 produce corresponding signal components at output terminal 6 which are in phase with those applied to terminal 3.

The resistor 90 connects the cathode of diode 64 to the 5.5 volt bus and serves as the diode load resistor for this diode, while resistor 92 connected between the anode of diode 72 and the 5.5 volt bus serves the same function for the latter diode. Resistor 94 connects the cathode of diode 64 to the minus input terminal 2 of the operational amplifier, and resistor 96 connects the anode of diode rectifier 72 to this same terminal, the two resistors 94 and 96 serving as an adding circuit and also providing isolation between the two diodes. In this manner the minus input terminal 2 of the operational amplifier is supplied with a short negative pulse for each cycle of the input square wave from input circuit 18 representing engine speed, and with similar short positive narrow pulses representing the phase of the output of the VCO.

A negative feedback path or circuit is provided between operational amplifier output terminals 6 and the minus input terminal 2 thereof. This negative feedback circuit comprises capacitor 98 connected directly between terminals 6 and 2, and, connected between the same two terminals, the resistor 100 in series with the parallel combination of resistor 102 and capacitor 104. Preferably, the time constant of this negative feedback circuit matches the time constant of the two differentiating circuits which supply the input pulses to the operational smplifier from input circuit 18 and from VCO 38, i.e. is comparable to, but slightly longer than, the decay time-constant of the input pulses. Capacitor 98 is of a low value not materially influencing the time constant of the feedback network, and merely serves to make the transition in state more reliable and consistent.

Operational amplifier output terminal 6 is also connected directly to a junction point 108 on a divider extending between the positive supply terminal 109 and ground, this divider being made up of the series combination of resistors 110, 112, 114 and 116. Resistors 112 and 114 are preferably of equal value, and resistors 110 and 116 are also preferably of equal value. The junction point 120 between resistors 110 and 112 is connected to the cathode of a diode rectifier 122, the anode of which is connected directly to the plus input terminal 3 of the operational amplifier. Another diode rectifier 124 has its anode connected to the junction point 126 between resistors 114 and 116, and its cathode connected directly to the plus input terminal 3 of the operational amplifier. The latter terminal 3 is also connected to the 5.5 volt bus by way of the parallel combination of resistor 130 and capacitor 132. The two diode rectifiers 122 and 124 therefore provide strong positive feedback from output terminal 6 to plus input terminal 3 when either of the latter diode rectifiers is conducting, and prevent such positive feedback at other times. Resistor 130 supplies the 5.5 volt bias to terminal 3, and provides a discharge path for capacitor 132; capacitor 132 is of small value, and has been found to improve reliability and reproducibility of transitions between states.

As will be described more fully presently, the phase detector just described has three stable states of the output voltage at terminal 6, namely: a central state of about 5.5 volts which exists when neither of the diodes 122 and 124 is conductive; one extreme state near ground, or zero volts, when diode rectifier 122 is rendered conductive; and an opposite extreme state of approximately the 11-volt supply voltage when diode rectifier 124 is rendered conductive. Each positive voltage pulse on line 42 will cause the phase detector to change to its next-lower voltage state and remain there, while each negative pulse on line 40 will cause the amplifier to switch to its next-higher state and remain there until a succeeding pulse occurs.

Considering the operation of the phase detector in more detail, if the voltage at output terminal 6 is about 5.5 volts, both of the diode rectifiers 122 and 124 will be non-conductive or blocked. This is because each of the divider resistors 112 and 114 then develops about 1.5 volts across itself, whereby junction point 120 is at about 7 volts and junction 126 at about 4 volts. Since under these conditions the anode of diode rectifier 122 is biased at about 5.5 volts, as is the cathode of diode rectifier 124, both rectifiers are back-biased and in their non-conductive conditions. Accordingly, under these circumstances there is no positive feedback to the plus input terminal 3. Since the diode rectifiers normally require about one-half volt of forward bias to become substantially conductive, diode rectifier 122 will become conductive only when the voltage at junction 120 falls to about 5 volts, and diode rectifier 124 will not conduct until the voltage at junction 126 rises to about 6 volts.

However, the negative feedback path is always present between output terminal 6 and minus input terminal 2. In the absence of positive feedback, plus input terminal 3 remains at about the supply voltage of 5.5 volts, and under these conditions the high-gain operational amplifier, acting through the negative feedback path, will cause the output voltage at terminal 6 to be driven to about 5.5 volts and to remain there, in its central state.

Now assume that a positive pulse is applied through diode rectifier 64 to minus input terminal 2, driving the voltage at output terminal 6 to about zero volts. Under these conditions, the proportions of the voltage divider are such that the cathode of diode rectifier 122 becomes about 2.75 volts, turning on the latter diode and causing its anode to assume a voltage of about 3.25 volts. Accordingly, the positive feedback path is thereby closed, the plus input terminal 3 assumes a voltage of about 3.25 volts, reduced from its previous 5.5 volts, and, because of the positive feedback connection, participates in driving the terminal 6 voltage to zero.

In the meantime, negative feedback through resistors 100 and 102 reduces the voltage at terminal 2 somewhat. However, even after the positive input pulse disappears, the voltage at terminal 2 is higher than that at terminal 3, and this differential in voltage between terminals 2 and 3 causes terminal 6 to remain at or near zero voltage, i.e in its lower stable state.

Now assume that shortly thereafter a negative pulse passes through diode 72 to input terminal 2 of the operational amplifier. This pulse will instantaneously lower the voltage of terminal 2 below the voltage at terminal 3, and the amplifier responds to this change by increasing the voltage at output terminal 6. As the latter output voltage increases, so do the voltages at terminals 2 and 3. The voltage at terminal 3 is raised by the action taken place through diode rectifier 122, and the voltage on terminal 2 is raised by the action taking place through the path made up of resistors 100 and 102 and capacitors 98 and 104. When the voltage at terminal 6 rises sufficiently to block the diode rectifier 122, the positive feedback is terminated. The voltage on terminal 2 continues to rise with further increases in the voltage of terminal 6 until terminals 2 and 3 are very nearly at the same voltage. This will occur when terminal 6 is at about 5.5 volts. During this time the negative pulse applied to terminal 2 through diode rectifier 72 is gradually disappearing, due to the decay rate of the differentiator by which it is produced. As it disappears, less negative-feedback voltage is required to hold terminal 2 at 5.5 volts. The negative feedback voltage of capacitor 104 is dissipated at a rate corresponding to the rate of discharge of the differentiator capacitor 70. When all is properly balanced, the phase detector will then stay in the state in which its output terminal is at about 5.5 volts as these signals disappear. There is thereby accomplished a transition from the lower state to the central state of the phase detector by means of the negative input pulse.

Also, if when the phase detector is in the central state a further negative pulse is applied to terminal 2 by way of diode rectifier 72, the terminal 6 voltage will change substantially to the supply voltage of 11 volts and remain there, placing the phase detector in its upper state, in a manner similar to the process described above by means of which the positive pulse on input terminal 3 caused the phase detector to change from its central state to its lower state. In this case the positive feedback path is established through diode rectifier 124 to hold the detector stable in its upper state. A positive pulse applied to terminal 2 when the detector is in its upper state will similarly cause it to perform a transition to its stable central state. Preferably the amplitude of the input pulses and the discharge time-constant of capacitor 104 are selected to provide reliable triggering from any one state to the next adjacent state, without danger of triggering through two states by a single pulse.

It is noted that the phase detector employs linear negative feedback in the sense that the parameters of the circuit do not vary with time, and employs non-linear positive feedback in the sense that the parameters of the positive feedback circuit change with time depending upon the bias voltages developed, so that at certain times, e.g. when one of the diode rectifiers 122 and 124 is conducting, the positive feedback is strong, and at other times when neither of these diode rectifiers conducts, the positive feedback is very weak, and in fact is zero.

Another significant feature of this phase detector circuit is its tolerance of the simultaneous occurrence of a negative pulse through diode rectifier 72 and a positive pulse through diode rectifier 64. If these pulses occur exactly simultaneously, or very nearly so, they cancel each other out and no stable transition occurs. If they are very close together but somewhat farther apart than assumed in the last example, the first pulse will produce a stable transition and, since the decay of the first pulse parallels closely the counteracting decay of the negative feedback charge on capacitor 104, the closely-following next pulse is strong enough to return the phase detector to its initial state without difficulty. Accordingly, proper, reliable and unambiguous switching of states of the phase detector occurs for all relative phases of the positive and negative pulses.

Figure 3:
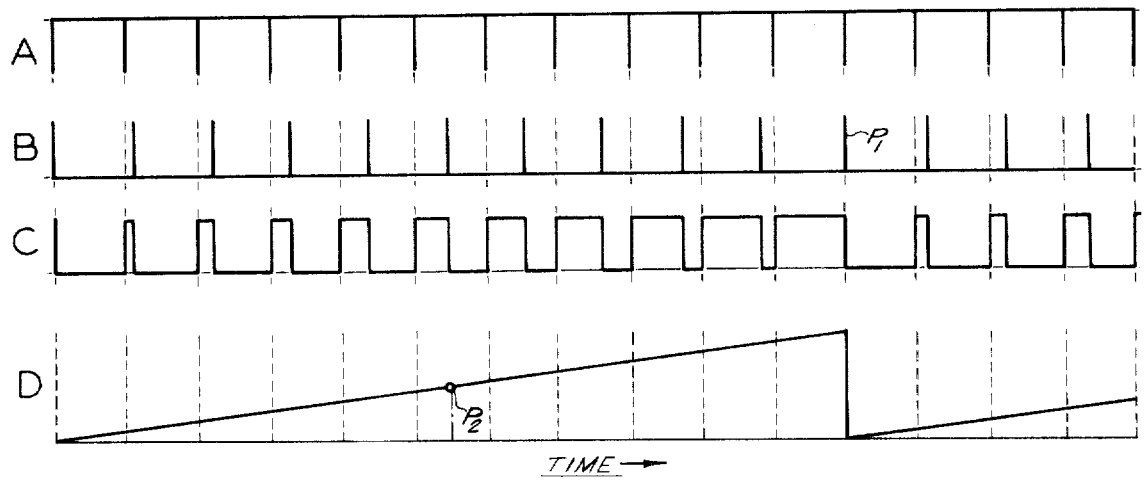
FIG. 3 is a graphical representation of the operation of a prior-art two state detector.
Figure 4:
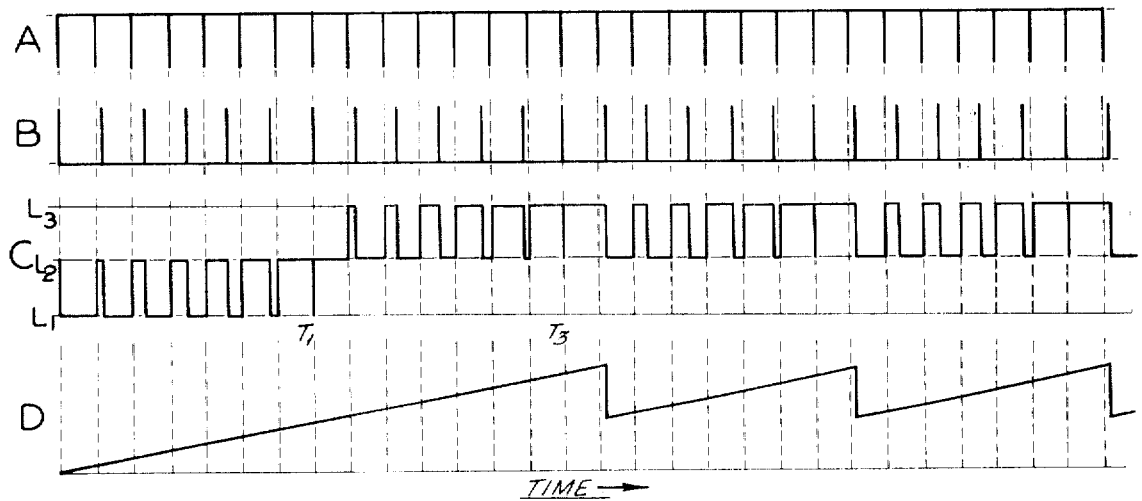
FIGS. 4–6 are graphical representations to which reference will be made in describing the operation of the invention.
Figure 5:
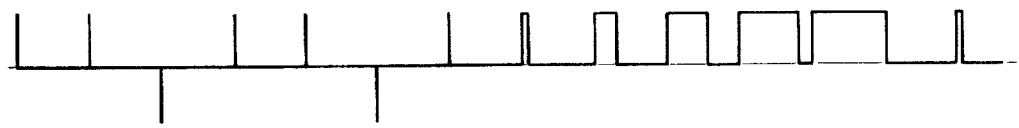

Referring now to the operation of the invention as brought out in FIGS. 3–5, FIG. 3 illustrates the typical operation of a prior-art two-state phase detector. At A thereof there is shown a series of equally time-spaced, very short negative pulses, and at B thereof a series of equally time-spaced, very short, positive pulses recurrent at a somewhat lower rate than those shown at A. As a result, the pulses shown at B lag progressively further behind those at A, until by the time the pulse shown at $P_1$ occurs the B series has fallen behind by a complete interpulse period and the pulses of the two series are again in step, after which the process repeats itself over and over.

C of FIG. 3 illustrates the output of a two-state phase detector in response to the pulses shown in A and B, and comprises a series of positive pulses each beginning at the time of a pulse in the series at A and ending at the time of the next pulse in the series at B; in other words, the negative pulses cause the phase detector to assume its upper state and the positive pulses cause it to assume its lower state. The pulses at C therefore start out very narrow, and become progressively wider as the pulses at B fall further behind, until a complete interpulse period is lost, at which point the process repeats itself.

At D of FIG. 3 there is illustrated in idealized form the variation in width of the pulses shown at C, and is similar to the voltage waveform which would be produced by a low-pass filter supplied with the output of a typical two-state phase detector. The wave is generally of saw-tooth form, increasing as the widths of the positive pulses at C increase, and repeating itself when a complete interpulse period has been lost, as at the time of the pulse $P_1$.

Such a two-state detector has several drawbacks. First, in order to provide a control voltage range for either direction of deviation of frequency, the null point of the control voltage, at which the frequency is at the desired value and no correcting voltage is to be applied to the feedback loop, is usually set at the center of the range, for example, at the voltage point $P_2$. Referring to C of FIG. 3, it will be seen that this is a point at which the output pulses from the phase detector have about a 50 percent duty cycle, that is, the positive pulses are substantially equal in duration to the times between them. Such a waveform is difficult to filter so as to remove the pulse components and leave substantially only a smoothly varying DC voltage, without thereby also slowing down the reaction time of the filter output voltage to frequency changes. Such filtering is, however, generally required both before supplying the phase detector output to the VCO in a phase-locked loop, and in deriving a control voltage suitable for operating an engine speed control, for example. This problem is particularly severe at low engine speeds for which the pulses are recurrent at a low frequency and would require strong low-frequency filtering to remove the pulse components, which strong filtering at low frequencies will interfere with the speed of response of the system.

Another difficulty is that this system provides no unambiguous control signal indicating that the frequency has moved outside of the lock-in range, since the output voltage produced under such conditions will lie within the same range as is used for control purposes normally.

Two-state detectors of the usual type are also susceptible to confusion when the two different input pulses thereto occur simultaneously or very nearly so, in that the detector may be left in the incorrect one of its two states after such a simultaneous occurrence.

FIG. 4 illustrates operation of a more-than-two-state phase detector of the invention. At A thereof there is again shown a series of negative pulses of constant repetition frequency, and at B thereof another set of negative pulses recurrent at a slightly lower constant repitition frequency. At C there is shown the output of the three-state detector prior to filtering, and in D there is represented the variation in width of these output pulses, which is similar to the waveform which would be obtaining from an idealized low-pass filter.

Referring to C of FIG. 4, the waveform shown varies between a lower extreme voltage state $L_1$, a central voltage state $L_2$ and an upper extreme voltage state $L_3$. Each of the negatively directed pulses shown at A of FIG. 4 causes the phase detector output voltage to move to its next higher of these three states, while each of the positive pulses shown at B of FIG. 4 causes it to move to its next lower state. As is shown in C of FIG. 4, if the detector is initially in its lower state, it will be moved back and forth between this lower state and its central state at times determined by the relative phases of the pulses at A and B until at time $T_1$, a complete interpulse period has been lost by the lagging of the pulses at B behind the pulses at A; at this time the transitions begin to take place between the center state and the upper state. This change occurs, essentially, because at this time two of the negative pulses shown at A will occur between immediately-successive positive pulses shown at B. After the next time $T_3$ when another complete period of phase delay has accumulated, the transitions will continue to occur between the middle and upper state primarily because there is no higher state to which the phase detector can go even though two negative pulses occur between two successive positive pulses, and it therefore remains in its upper state. This process continues thereafter so long as the frequency of the pulses at A is higher than the frequency of the pulses at B. Should the pulses at B recur at a frequency higher than those at A, then there would shortly occur a case in which there were two positive pulses between two successive negative pulses, and the phase detector would be moved downward so as to vary between its center state and its lower state.

The waveform at D of FIG. 4 comprises a sawtooth varying first from a level corresponding to the lower state of the phase detector to a level corresponding to the upper state thereof, throughout a time period equal to twice that required for the loss of a complete cycle of phase. Thereafter the voltage at D varies in sawtooth form between the middle and upper level at a rate equal to the difference in frequency of the pulses at A and B, as shown.

Several operational advantages of the invention can be appreciated from a consideration of the graphs of FIG. 4. First, it will be appreciated that when the null point is set at the time $T_1$ there exists a lock-in range suitable for control purposes which extends on both sides of the null point by an amount corresponding to a complete cycle of phase slippage between the two series of positive and negative pulses, a range which is twice that available in the two-state phase detector. Secondly, when the phase detector is locked in and operating at or very near a null point coinciding with the center state of the detector, the output of the phase detector will be of the nature shown in the first half of the graph of FIG. 5, consisting of the center state voltage with occasional extremely-narrow pulses extending in one direction or the other therefrom. Therefore when the null point is set at an interior state of the phase detector, namely, at the center state in this example, the output pulses thereof in the lock-in condition are of extremely low duty cycle. This permits them to be very easily filtered out to obtain a control voltage for controlling engine fuel supply and for controlling the VCO. Also, should the engine speed depart suddenly and radically from its desired speed, due for example to application of a sudden high load to the engine, the phase detector will operate between its center state and one of its extreme states as represented at the right of FIG. 4C, producing at the phase detector output the recurrently-variable width pulses shown at the right of FIG. 5, the width variations and hence the average value of this pulse signal being as shown at the right of FIG. 4D. The latter type of signal, after appropriate averaging or filtering, and when applied through a suitable integrating circuit to operate the fuel control for the engine, will constantly and unambiguously urge the engine speed in the direction to return it toward the lock-in range; a directly analogous operation occurs should the frequency of the pulses of B momentarily exceed those of A.

Referring now again to FIG. 2, the phase detector output on lead 140 is applied to the gain control circuit 26, made up of the variably-tapped resistor 142 connected from lead 140 to ground, and a fixed resistor 144 connected between the resistor tap and ground. This gain control circuit controls the amount of deviation of the VCO produced by a given change in phase detector output voltage, and since the VCO follows the frequency of the engine-speed representing input signal, the range of variation of the average value of the signal on lead 140 for a given change in engine speed is therefore also determined by the setting of gain control 26. This therefore serves as a gain control for the entire feedback loop through the phase detector to the engine fuel control and enables easy matching of the control voltage range to the fuel control range for any given application.

The output of the gain control 26 is supplied through the low-pass filter 36 to the frequency-controlling terminal of the VCO 38, the low-pass filter consisting of a simple arrangement of series resistor 146 and shunt capacitor 148, which is adequate to reject to a sufficient degree the pulse variations in the voltage on line 140 while at the same time permitting rapid response of the VCO to engine speed changes.

The output of the phase detector on lead 140 is also passed through the low-pass filter 48 made up of series resistor 150 and shunt capacitor 152 to provide a smoothly-varying DC control voltage for application to the plus input terminal 3 of differential operational amplifier 160. The latter operational amplifier may be a conventional device such as is used for the operational amplifier in the above-described more-than-two state phase detector. More specifically, in this example of the operational amplifier, terminal 4 is connected to ground, input and output compensation capacitors are employed in the conventional manner, and the positive supply potential (in this example 11 volts) is applied to terminal 7. Amplifier 160 not only provides amplification, but also serves as an integrator by virtue of the capacitor 170 connected between the amplifier output terminal 6 and the minus input terminal 2 thereof, by way of input resistor 162. Terminal 2 is appropriately biased by way of variable resistor 163 connected to a tap point between the divider resistors 164 and 165, themselves connected in series between the positive supply and ground. The voltage at the tap point between resistors 164 and 165 determines the voltage level of the null point corresponding to the desired engine speed. The voltage at the tap point is selected to correspond to the center state of the phase detector. The output of the amplifier on lead 172 is supplied to the power amplifier and control circuit 30 for subsequent application to the fuel control 12 for determining and correcting the engine fuel supply.

The use of the integrator causes correction of the fuel control position whenever the output of the phase detector varies from its center state null condition, thereby providing isochronous operation as is desired in many important applications.

Figure 6:
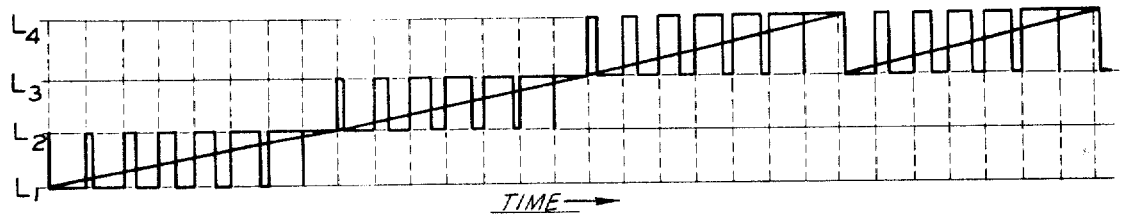

While a three-state detector has been shown and described in detail, phase detectors of four or more states may be constructed and used in the system of the invention. FIG. 6 illustrates the operation of a four-state phase detector, having states $L_1$, $L_2$, $L_3$ and $L_4$, with the sawtooth waveform representing pulse width superimposed on the phase detector pulses produced by two series of input pulses of different frequencies. Such a circuit will have an increased lock-in range as compared with the three-state detector, and has an exclusive central range of variation between states $L_2$ and $L_3$ which is present only during phase lock. If operated with a null point at the center of its output voltage range, it has about 50 percent duty cycle and will not exhibit the improvement in ease of filtering described above. However, it is possible to operate it with the null point at an interior state such as $L_2$ or $L_3$ if desired, with improvements in ease of filtering. In general, detectors with an odd number of states have properties similar to each other, as do the detectors having an even number of states.

Without thereby limiting the scope of the invention, the following example of circuit values is given in the interest of definiteness:

Resistors 62 and 70 each 2,200 ohms
Resistors 90 and 92 each 10,000 ohms
Resistors 94 and 96 each 100,000 ohms
Resistor 130 30,000 ohms
Resistors 102 300,000 ohms
Resistors 100 68,000 ohms
Resistors 82 2,000 ohms
Resistors 110 and 116 each 24,000 ohms
Resistors 112 and 114 each 8,200 ohms
Capacitors 60 and 68 each .0047 microfarad
Capacitor 132 15 picofarads
Capacitor 104 200 picofarads
Capacitor 98 10 picofarads
Capacitor 84 15 picofarads
Capacitor 80 100 picofarads While the invention has been described with particular reference to specific embodiments thereof in the interest of complete definiteness, it will be understood that it may be embodied in a variety of diverse forms differing from those specifically described, without departing from the spirit and scope of the invention as defined by the appended claims.

What is claimed is:

1. An electric governor system for an engine, comprising:
   pickup means responsive to operation of said engine for producing a first series of short pulses in phase with said engine operation;
   a more-than-two-state phase detector supplied with said first series of pulses;
   a voltage controlled oscillator for producing an output signal having a frequency determined by a control voltage supplied thereto;
   means for deriving from the output of said voltage controlled oscillator a second series of pulses in phase with said output signal and for applying said second series of pulses to said phase detector;
   each pulse of one of said first and second series moving said phase detector to its next higher stable state, and each pulse of the other of said first and second series moving said phase detector to its next lower stable state;
   low-pass filter means supplying the output of said phase detector to said voltage controlled oscillator as a control voltage to vary the frequency thereof in the sense to produce a phase-locked condition when said first and second series of pulses are near each other in frequency;
   fuel control means variable in response to a varying control signal to vary controlledly the rate of supply of fuel to said engine; and
   means for deriving a signal varying in accordance with the average of said phase detector output and for applying it to determine the control signal for said fuel control means.

2. The governor system of claim 1, comprising integrator means connected between the output terminals of said phase detector and said fuel control means.

3. The governor system of claim 2, wherein said system is operative to maintain the speed of said engine at a predetermined reference speed, and the null value of the average of said phase detector output for which said reference speed is produced is substantially equal to the level of an interior stable state of said phase detector.

4. The governor system of claim 1, wherein said system is operative to maintain the speed of said engine at a predetermined reference speed, and the null value of the average of said phase detector output for which said reference speed is produced is substantially equal to the level of an interior state of said phase detector.

5. The governor of claim 1, in which said more-than-two-state phase detector is a three-state phase detector.

6. The governor system of claim 1, comprising gain-control means for manually adjusting the gain afforded to said control signals applied to said voltage controlled oscillator.

7. The governor system of claim 1, in which said more-than-two-state phase detector comprises:
   an amplifying circuit having an output terminal, a non-inverting input terminal, and an inverting input terminal; a direct-coupled negative feedback path connecting said output terminal to said inverting input terminal; a direct-coupled positive feedback path connecting said output terminal to said non-inverting input terminal; means for causing said negative feedback path to provide negative feedback stronger than the positive feedback produced by said positive feedback path when the voltage at said output terminal is within a predetermined range thereby to provide a first stable interior state for said phase detector, and for causing said positive feedback to exceed said negative feedback when said voltage of said output terminal is in either of two other ranges on opposite sides of said predetermined range thereby to provide two other stable states for said phase detector on opposite sides of said first stable state; and means for applying pulse signals to at least one of said input terminals for switching said voltage at said output terminal between said predetermined range and said other ranges thereby to switch said phase detector between said first stable state and said other stable states.

8. The detector of claim 7, comprising electronic switch means for effectively opening said positive feedback path when said voltage at said output terminal is in said predetermined range and for closing said positive feedback path when said voltage at said output terminal is outside said predetermined range.

9. The detector of claim 8, in which said electronic switching means comprises unilaterally-conductive means connecting said positive feedback path to said output terminal, and means for biasing said unilaterally-conductive means in a conductive state when the voltage at said output terminal is outside said predetermined range and in a non-conductive state when said voltage at said output terminal is within said predetermined range.

10. The detector of claim 7, in which said pulse signals have a predetermined decay time constant, and in which said negative feedback path comprises capacitive means providing a decay time-constant slightly longer than the decay time-constant of said pulses.

* * * * *